(12) United States Patent
Schwuger et al.

(10) Patent No.: US 6,205,876 B1
(45) Date of Patent: Mar. 27, 2001

(54) SLIDING SLEEVE OF A SYNCHRONIZER ASSEMBLY FOR MANUAL TRANSMISSIONS

(75) Inventors: Josef Schwuger, Höchstadt/Aisch; Rudolf Sinner, Bubenreuth; Hartwig Waldert, Aisch, all of (DE)

(73) Assignee: INA Walzlager Schaeffler oHG (DE)

( * ) Notice: Subject to any disclaimer, the term of this patent is extended or adjusted under 35 U.S.C. 154(b) by 0 days.

(21) Appl. No.: 09/299,380

(22) Filed: Apr. 27, 1999

(30) Foreign Application Priority Data

May 8, 1998 (DE) .............................. 198 20 654

(51) Int. Cl.[7] .................................................. F16D 23/14
(52) U.S. Cl. ..................... 74/339; 74/473.36; 192/53.34; 192/69.9
(58) Field of Search ................................ 74/339, 473.36; 192/69.6, 53.1, 53.3–53.33, 53.34–53.343; 29/893.33, 893.34, 893.32

(56) References Cited

U.S. PATENT DOCUMENTS

| Re. 20,373 |   | 5/1937 | Murray ............................. 192/53.36 |
| 1,908,187 | * | 5/1933 | Ross .................................. 29/893.35 |
| 2,256,308 | * | 9/1941 | Bixby et al. ...................... 192/53.33 |
| 2,908,366 |   | 10/1959 | Altmann ........................... 192/53.33 |
| 3,355,909 | * | 12/1967 | Russey et al. ................. 192/53.34 X |
| 3,688,549 | * | 9/1972 | Ohnishi et al. ............... 29/893.34 X |
| 3,894,619 | * | 7/1975 | Bibbens ............................. 192/82 R |
| 4,013,153 | * | 3/1977 | Morino et al. .................. 192/53.343 |
| 4,487,047 | * | 12/1984 | Killop ........................... 29/893.34 X |
| 4,599,775 | * | 7/1986 | Büscher ............................ 29/893.33 |
| 4,672,729 | * | 6/1987 | Hoguchi et al. ................. 29/893.34 |
| 4,700,446 | * | 10/1987 | Schmid et al. .................... 29/893.34 |
| 5,096,037 | * | 3/1992 | Knoess et al. ................. 192/69.9 X |

FOREIGN PATENT DOCUMENTS

| 386218 | * | 12/1923 | (DE) . |
| 2537495 |   | 3/1976 | (DE) . |
| 3621085 |   | 1/1987 | (DE) . |
| 196 50 343 | * | 7/1997 | (DE) . |
| 0717212 |   | 6/1996 | (EP) . |
| 2663390 | * | 12/1991 | (FR) . |
| 356140 |   | 9/1931 | (GB) . |
| 066009 | * | 5/1980 | (JP) ..................... 192/53 F |

* cited by examiner

Primary Examiner—Charles A. Marmor
Assistant Examiner—Ankur Parekh
(74) Attorney, Agent, or Firm—Bierman, Muserlian and Lucas

(57) ABSTRACT

A sliding sleeve of a synchronizer assembly for manual transmissions, said sliding sleeve having a sleeve body made by a non-chipping shaping procedure which sliding sleeve receives a gearshift fork guide on an outer peripheral surface and has a toothing extending in a direction of a central longitudinal axis of the sleeve body on an inner peripheral surface wherein the sleeve body is made as a one-piece component of sheet metal by a non-chipping shaping procedure.

3 Claims, 4 Drawing Sheets

SLIDING SLEEVE OF A SYNCHRONIZER ASSEMBLY FOR MANUAL TRANSMISSIONS

A sliding sleeve of a synchronizer assembly for manual transmissions, said sliding sleeve having a sleeve body made by a non-chipping shaping procedure which sliding sleeve receives a gearshift fork guide on an outer peripheral surface and has a toothing extending in a direction of the central longitudinal axis on an inner peripheral surface.

BACKGROUND OF THE INVENTION

A sliding sleeve of the above type is known, for example, from DE 39 08 989 C2 and is formed by two symmetrical or almost symmetrical halves which are produced separately by a shaping procedure and then connected to each other by a joining process. Each symmetrical half comprises a disc-shaped, circumferential shoulder projecting radially outwards from its outer peripheral surface. After the joining of the two symmetrical halves, the end faces of the shoulders oriented towards the central transverse plane of the sliding sleeve, and the cylindrical surface defined between these shoulders on the outer peripheral surface together form the gearshift fork guide.

The inner peripheral surface of this sliding sleeve comprises a toothing whose teeth, as seen from the end face, taper in cross-section towards the central transverse plane so that central cavities are formed in the central transverse plane on the tooth flanks. These cavities assure that the teeth of the sliding sleeve and those of the dog-type toothing of the clutch body or of the gear wheel which mesh with each other when a gear has been selected cannot come disengaged from each other, particularly during load alternation. Besides the cavities on the tooth flanks, it is also possible to arrange, for example, recesses and grooves on or between the teeth of the internal toothing of sliding sleeves. Further, the ends of the teeth of sliding sleeves are often provided with roof slopes.

These recesses are engaged by the locking pins of the synchronizer assembly which are generally biased by a spring. This locks the sliding sleeve in its neutral position when no gear has been selected. The grooves which are aligned to the central longitudinal axis of the sliding sleeve serve, for example, to receive and guide thrust members of the synchronizer assembly. When the sliding sleeve is displaced in axial direction for selecting a gear, the thrust members press the synchronizer ring against the friction cone of the clutch body. The roof slopes of the teeth prevent the toothing of the sliding sleeve from locking prematurely into the toothing of the clutch body or of the gear wheel during synchronization. But when synchronization has been terminated, the roof slopes facilitate this locking.

There are other types of sliding sleeves which, in addition to the toothing on the inner peripheral surface, also possess a toothing on the outer peripheral surface of the sleeve body. This external toothing is engaged, for example, by a sliding intermediate gear wheel of the reverse gear in so-called compact transmissions when the sliding sleeve is situated in a position of shift between the first and the second gear of a manual transmission.

It is known that the cost of production of the sliding sleeve can be reduced compared to machining methods by the use of non-chipping procedures. In the state of the art, it is not possible to produce the aforesaid profiles viz., cavities, recesses, grooves and roof slopes, in one-piece sliding sleeves exclusively by non-chipping shaping. This is the case because the contours of these recesses overlap. For example, the contours of a drawing die or project beyond them and thus form undercuts in the direction of die removal.

For producing sliding sleeves exclusively by non-chipping methods, these undercuts have been avoided thus far as described in the example of DE 39 08 989 C2 by making the sleeve body of the sliding sleeve in two separate parts which are then joined together. The joining plane of these two parts extends through the plane of separation of the cavities so that no undercuts are formed in the direction of removal, for example, of a drawing die. In this example, the joining plane corresponds also to the plane of symmetry of the sliding sleeve because the two parts of the sleeve which are joined together have a symmetrical or almost symmetrical configuration.

There are also sliding sleeves in which the recesses on the inner diameter for receiving the locking pins and/or the grooves for guiding the thrust members are arranged in the central transverse plane, and the cavities are disposed between the central transverse plane and the end faces of the sliding sleeve in the tooth flanks. It is also possible to provide both a groove or a recess as well as a cavity on the flanks of one and the same tooth. If these prior art sliding sleeves are to be produced exclusively by non-chipping methods, undercuts can only be avoided by providing more than two joining planes so that the sleeve body must be made of more than two separate parts. The drawback of this is that, with an increasing number of individual components of a sliding sleeve, the equipment and production costs are also increased. The joining of the sleeve components leads to the addition of the dimensional and shape deviations arising from the joint to the already existing dimensional and shape deviations of the recesses, cavities and grooves. This detracts from the precision of the finished sliding sleeve.

If it is not possible to make the sleeve body by joining several parts together, the recesses have to be made by an additional work step of machining. This leads to additional processing and handling costs which increase the cost of manufacture of the sliding sleeve.

In DE 39 08 989 C2, a circumferential shoulder is arranged on the outer peripheral surface of each symmetrical half of the sliding sleeve. When the two halves are joined together, the opposing end faces of these shoulders and the part of the outer peripheral surface of the sleeve body enclosed between them form a circumferential groove, that is to say, the gearshift fork guide, into which a gearshift fork of the manual transmission engages. These shoulders constitute stops through which the axial displacement is transmitted by the gearshift fork to the sliding sleeve. The joining plane formed by the joining of the symmetrical halves also forms the central transverse plane of the sliding sleeve and thus also the central transverse plane of the gearshift fork guide. Consequently, the dimensional and shape deviations of the joint are added to the dimensional and shape deviations of the gearshift fork guide. In this case too, the joint therefore detracts from the precision of the sliding sleeve.

OBJECTS OF THE INVENTION

It is therefore an object of the invention to create a sliding sleeve of the pre-cited type which is economical to manufacture and permits any desired arrangement of recesses, cavities and grooves without a detrimental effect on the precision of the sliding sleeve.

This and other objects and advantages of the invention will become obvious from the following detailed description.

SUMMARY OF THE INVENTION

The invention achieves these objects by the fact that the sleeve body is made as a one-piece component of sheet metal by a non-chipping shaping procedure. The use of sheet metal as a base material for making sleeve bodies or sliding sleeves permits the use of simple cutting and shaping tools. Profiles like the aforesaid internal toothing, recesses, grooves, cavities and roof slopes on the toothing can be made in the sheet metal strip or blank in the flat state, for example, by stamping, roller-burnishing and rolling. In contrast to a cylinder-shaped sleeve body of the state of the art, no undercuts are formed in the direction of removal of the tools. Since these profiles are free of undercuts and can be disposed in any desired arrangement, it is possible to manufacture the sleeve body as a one-piece component. The production and handling costs for the joining of two or more parts of a sleeve body are therefore not incurred. The finished profiles and the sliding sleeve possess a high degree of precision because no additional shape and dimensional tolerances arise due to joints. Subsequent machining operations are not required.

An advantage of making components of sheet metal is that the individual steps like cutting to size, profiling, and shaping can all be carried out in one and the same fabrication plant or production unit. This results in a shortening of processing time during manufacturing since handling and transportation times are eliminated. These production methods are particularly suitable for large-scale manufacturing. This advantage can also be utilized in the manufacture of a sleeve body out of sheet metal according to the invention. The starting material for making the sleeve body is a profiled sheet metal strip having the required profiles such as the internal toothing and its grooves as well as recesses, cavities and roof slopes. A length of sheet metal strip corresponding to the circumference of the sleeve body can be cut off, for example, from continuous strip material. The final cylindrical shape of the sleeve body is obtained by bending this sheet metal strip into a round shape so that its ends abut and then joining the ends to each other. A preferred method of joining is welding.

According to one proposition of the invention, the gearshift fork guide on the outer peripheral surface of the sleeve body is constituted by an integrally formed shoulder of the sleeve body or by at least one ring arranged on the outer peripheral surface of the sleeve body. In an advantageous embodiment of the invention involving a minimum of material and manufacturing, the sleeve body and the gearshift fork guide are made in one piece with each other, the gearshift fork guide being constituted by a disc-shaped circumferential shoulder projecting radially outwards from the outer peripheral surface of the sleeve body. In order that the axial displacement of the gearshift fork of the manual transmission be transmitted to the sliding sleeve, the ends of the gearshift fork engage around the gearshift fork guide. A sliding sleeve of this type offers the advantage that both the shoulder and the internal toothing, as well as the other profiles, can be made in the sheet metal without chip removal.

In another embodiment of the sliding sleeve of the invention, the sleeve body and the gearshift fork guide are made as separate parts and then fixed to each other. The advantage of a sliding sleeve configured in this manner is that, when manufacturing different types of sliding sleeves, individual parts can be put to multiple use. To this end, the outer diameters of different sleeve bodies and the inner diameters of different rings of the gearshift fork guide are matched to each other and standardized in diameter. Thus, for example, if two sliding sleeves differ from each other only in the configuration of their internal toothing, it is only necessary to fabricate different sleeve bodies.

According to the invention, the sleeve bodies can be made of sheet metal or as a solid part without chip removal. The rings of the gearshift fork guide of both sleeves, however, remain the same. If the sleeve bodies have the same configuration, it is only the rings of the gearshift fork guide that have to be specially produced, or the same rings are differently combined in their arrangement on the outer diameter.

According to a further feature of the invention, the gearshift fork guide may be a single ring fixed on the outer peripheral surface of the sleeve body. In this embodiment, too, the gearshift fork engages around the gearshift fork guide. In still another embodiment of the invention, the gearshift fork guide is constituted by a sleeve body and two rings fixed on its outer peripheral surface. Rings of the same configuration can be used in both embodiments just described. Many different combinations are possible in sliding sleeves having a gearshift guide formed by two rings. Thus, rings of different configuration can be used on the same sliding sleeve and/or the rings can be differently spaced from each other from one sliding sleeve to another.

In a further advantageous embodiment of a sliding sleeve of the invention made by non-chipping shaping, the rings of the gearshift fork guide are also made by non-chipping shaping. A particularly cheap ring using a minimum of material is obtained by making the ring of wire or of a sheet metal strip. In one possible configuration, the ring has a U-shaped cross-section with it s legs extending radially outwards. This ring can be made by the same or similar methods as used for the fabrication of the sleeve body. In the manual transmission, the gearshift fork engages between the legs of this ring where it is also guided. The advantage of this embodiment is that only one ring is fixed on the outer peripheral surface of the sleeve body but the guidance of the gearshift fork is the same as in a sliding sleeve having two rings. Thus, handling and assembly costs for the fixing of a second ring are saved.

The rings of the gearshift fork guide can be fixed on the outer peripheral surface of the sleeve body by welding or shrink-fitting. According to another feature of the invention, a ring of the gearshift fork guide shrink-fitted on the sleeve body can be additionally secured to resist axial displacing forces. The inner peripheral surface of the ring comprises an internal circumferential groove, and on the outer peripheral surface of the sleeve body, there is arranged a circumferential, outwards directed shoulder having a height H. For shrink-fitting on the sleeve body, the ring is heated and thus expands so that its inner diameter is enlarged due to thermal expansion. The height H of the outwards directed shoulder is matched to this thermal expansion of the ring, i.e. the maximum height of this shoulder is determined so that the heated ring can be pushed over the shoulder. During assembly, the ring is pushed over the outwards directed shoulder and brought into position so that, upon cooling and shrinking of the ring, the groove engages around the outwards directed shoulder. In this way, besides being shrink-fitted, the ring is additionally secured in place.

In a further embodiment of the invention, an inwards directed shoulder is formed on the inner peripheral surface of the ring of the gearshift fork guide. An external circumferential groove on the outer peripheral surface of the sleeve body engages around this shoulder when the ring of the gearshift fork guide is shrink-fitted on the sleeve body. The height HI of the shoulder on the inner peripheral surface of the ring is configured so that the ring, heated for assembly, can be pushed on to the outer peripheral surface of the sleeve body.

In still another embodiment of the invention, the outer peripheral surface of the sleeve body comprises a stop which serves to locate the ring or rings of the gearshift fork guide which facilitates the mounting of the gearshift fork guide on the sleeve body.

According to a further feature of the invention, the internal toothing of the sleeve body comprises a symmetric or asymmetric roof slope which is particularly used in sliding sleeves for synchronizer devices having a locking toothing.

According to further features of the invention, in the case of sliding sleeves having an external toothing, this external toothing may be made either in a ring of the gearshift fork guide or on the outer peripheral surface of the sleeve body. The external toothing is made preferably by a non-chipping shaping process. It is also conceivable to make the ring with the external toothing by stamping.

The invention will now be described with the help of several embodiments illustrated in the drawings.

DETAILED DESCRIPTION OF THE DRAWINGS

Figure 1:
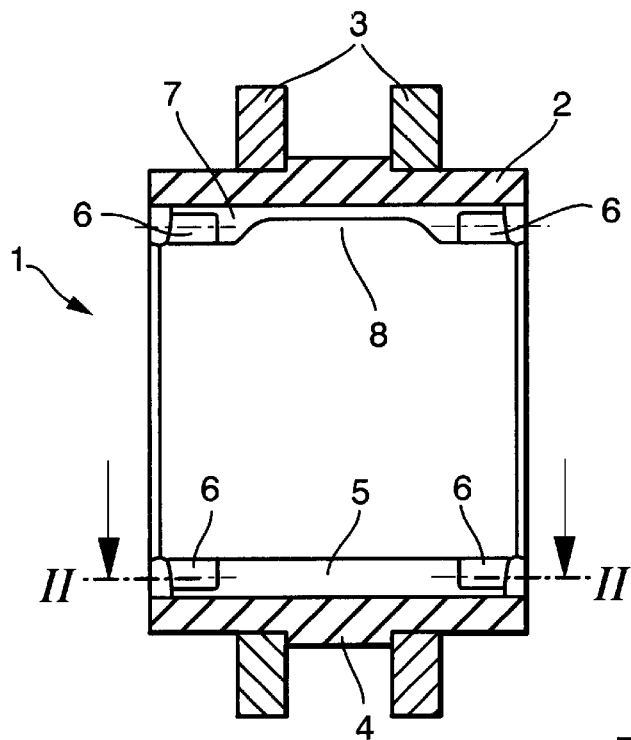
FIG. 1 is a longitudinal cross-section through a sliding sleeve of the invention in which a gearshift fork guide formed by two rings is received on the outer peripheral surface of a sleeve body.

A sliding sleeve identified at (1) in FIG. 1 comprises a sleeve body (2) made by shaping without chip removal out of sheet metal and two rings (3) having, by way of example, a rectangular cross-section. A stop (4) configured as a radial collar is arranged on the outer peripheral surface of the sleeve body (2). By way of example, this stop (4) is represented in FIG. 1 as having a continuous circumferential configuration and not an interrupted one. On its inner peripheral surface, the sleeve body (2) comprises an internal toothing (5) and the stop (4) and the internal toothing (5) are configured directly on the sleeve body (2). The rings (3) are arranged parallel to each other and symmetric to a central transverse plane of the sleeve body (2) while being located on the stop (4) and fixed in place, in the present example, by an interference fit. The end faces of the rings (3) oriented towards the central transverse plane, and the peripheral surface of the stop (4) form the gearshift fork guide.

Figure 2:
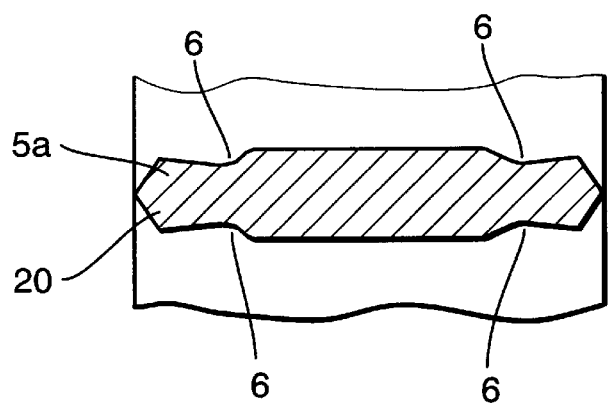
FIG. 2 is an enlarged sectional view of a tooth of FIG. 1 along line II.
Figure 3:
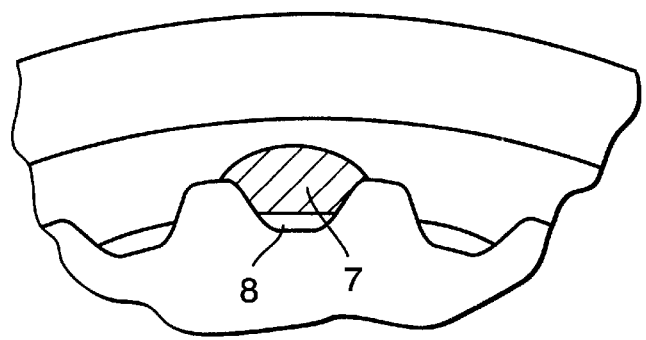
FIG. 3 is a detail out of an end view of the sliding sleeve of FIG. 1 showing a partial section through a tooth.

FIGS. 1 and 2 show cavities (6) made in the tooth flanks of the teeth (5a) and (7) by shaping without chip removal. The sectional view of the tooth (5a) shown in FIG. 2 illustrates the roof slopes (20) and the undercut contours of the cavities (6). Individual teeth (7) of the internal toothing (5) comprise grooves (8) which extend in the longitudinal direction of the teeth and serve to receive thrust members, not shown, of the synchronizer device. FIG. 3 shows a sectional view turned through 90° with respect to FIG. 1, through a tooth (7) having a groove (8).

Figure 4:
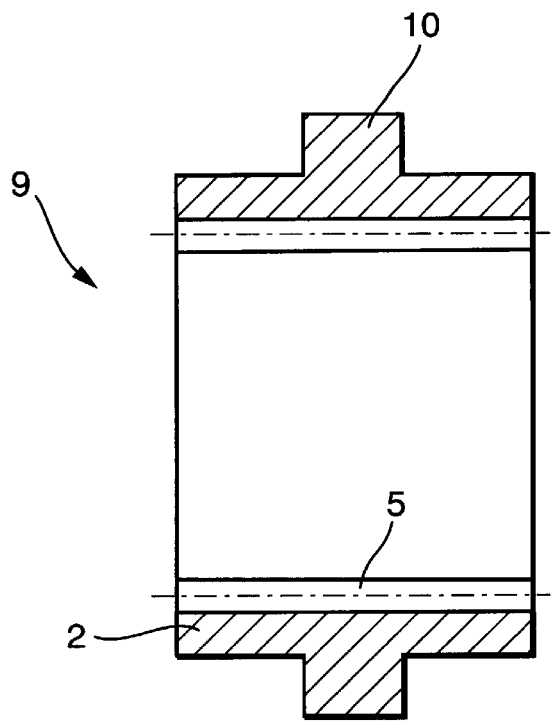
FIG. 4 is a longitudinal cross-section of a one-piece sliding sleeve of the invention.

FIG. 4 shows a sliding sleeve (9) which is made in one piece out of a sleeve body (2) having an internal toothing (5) and a shoulder (10). The shoulder (10) is arranged on the central transverse plane of the sliding sleeve, and its peripheral surface and end faces together with the outer peripheral surface of the sleeve body (2) form the gearshift fork guide.

FIG. 4 shows a further example of a sliding sleeve. This sliding sleeve (14) is made up of two parts. A single ring (12) is fixed on the one-piece sleeve body (2) which has a toothing (5) and a stop (13). The fixing of the single ring (12) on the sleeve body (2) is effected in this embodiment by a shrink fit. During mounting on the sleeve body (2), the ring (12), represented in this figure by way of example with a rectangular cross-section, is positioned and located on the stop (13).

Figure 5:
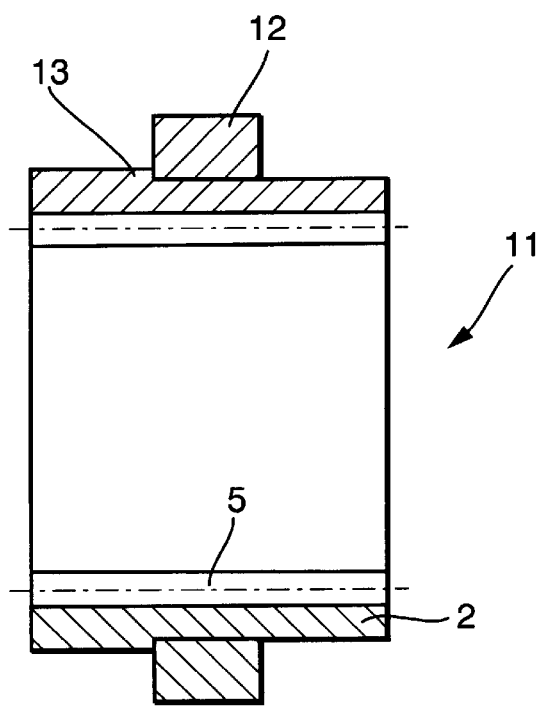
FIG. 5 is a longitudinal cross-section of a sliding sleeve of the invention having a gearshift fork guide constituted by a single ring.
Figure 6:
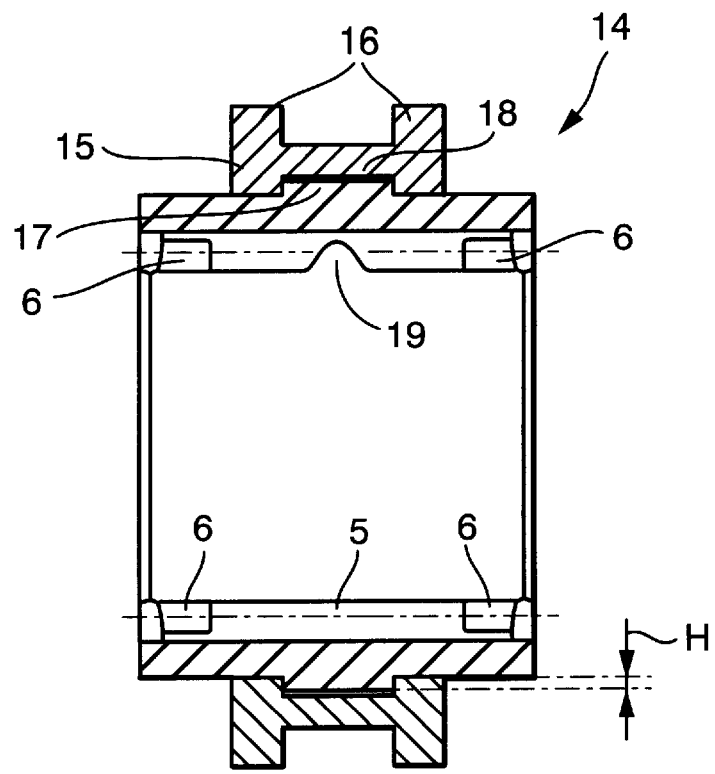
FIG. 6 is a sectional view of a sliding sleeve of the invention having a gearshift fork guide constituted by a U-shaped ring whose internal groove engages around the outer shoulder of the sleeve body.

The sliding sleeve (14) of FIG. 5 comprises a sleeve body (2) having an internal toothing (5) and a ring (15). Cavities (6) are made in the internal toothing (5) and one of the teeth of this internal toothing (5) comprises a recess (19). This recess (19) is engaged by a locking pin, not shown, of the synchronizer device. The ring (15) is U-shaped in cross-section with the two legs (16) of the ring (15) being directed radially outwards. The end faces of the legs (16) oriented towards the central transverse plane, and the outer peripheral surface of the ring (15) defined between these end faces form the gearshift fork guide. An internal groove (18) on the inner peripheral surface of the ring (15) engages around the outwards directed shoulder (17) formed integrally on the sleeve body (2).

Figure 7:
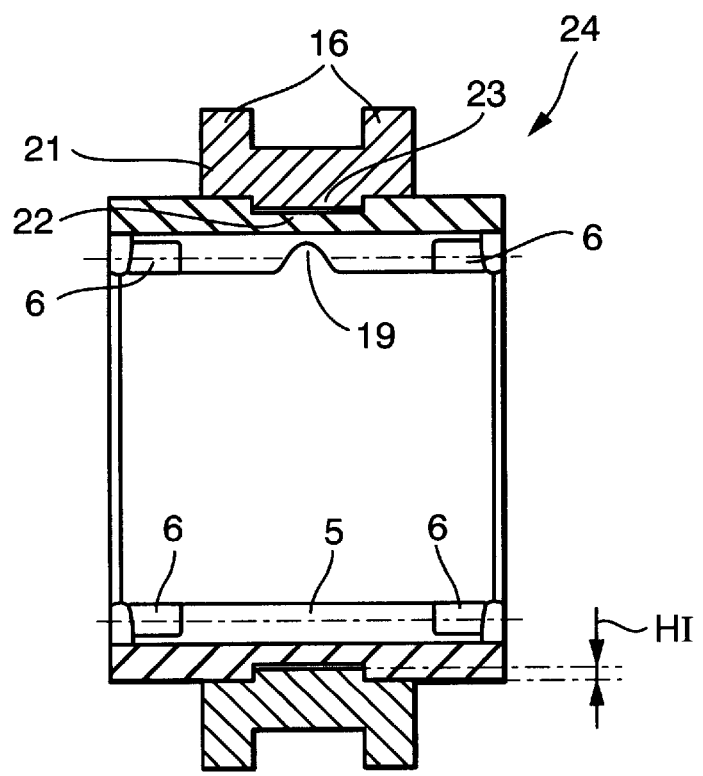
FIG. 7 is a sectional view of a sliding sleeve of the invention having a gearshift fork guide constituted by a U-shaped ring whose inwards directed shoulder is engaged by an external groove of the sleeve body.

FIG. 7 shows a sliding sleeve (24) corresponding in configuration substantially to the sliding sleeve (14). A ring (21) with a U-shaped cross-section arranged on the outer peripheral surface of the sliding sleeve (24), however, comprises an inwards directed shoulder formed on its inner peripheral surface. This shoulder (23) engages into an external groove (22) which extends circumferentially around the outer peripheral surface of the sleeve body (2).

Figure 8:
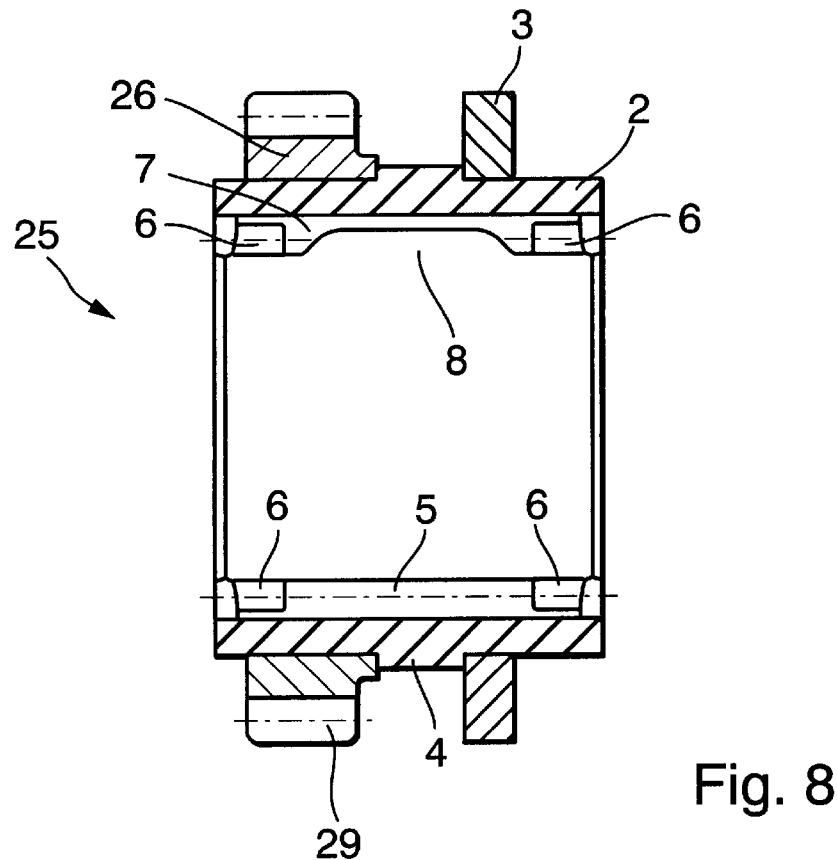
FIG. 8 is a sectional view of a sliding sleeve of the invention having a gearshift fork guide constituted by two rings, one of which rings has an external toothing.

FIG. 8 shows a sliding sleeve (25) on whose outer peripheral surface are fixed a ring (3) and a further ring (26) having an external toothing (29).

Figure 9:
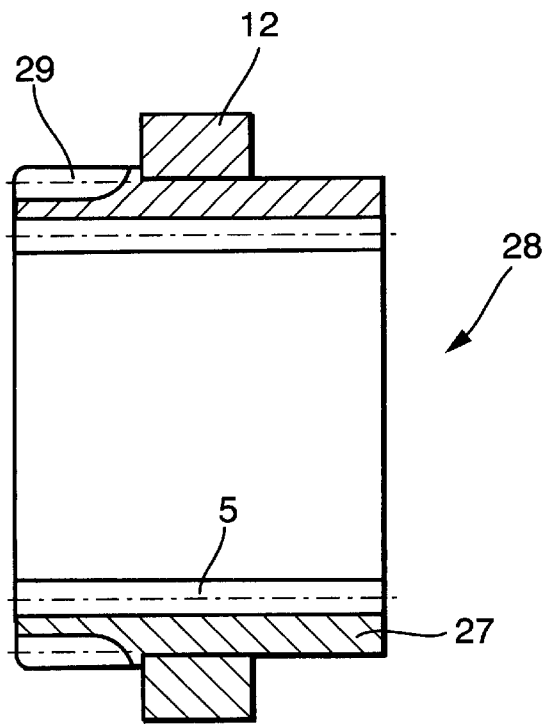
FIG. 9 is a sectional view of a sliding sleeve of the invention having an external toothing formed on the sleeve body.

FIG. 9 shows a sliding sleeve (28) having an external toothing (29) formed on its sleeve body (27).

Various modifications of the sliding sleeve of the invention may be made without departing from the spirit or scope thereof and it should be understood that the invention is intended to be limited only as defined in the appended claims.

What we claim is:

1. A sliding sleeve of a synchronizer assembly for manual transmissions, said sliding sleeve having a sleeve body made by a non-chipping shaping procedure which sliding sleeve receives a gearshift fork guide on an outer peripheral surface and has a toothing extending in a direction of a central longitudinal axis of the sleeve body on an inner peripheral surface wherein the sleeve body is made as a one-piece component of sheet matel by a non-chipping shaping procedure, the sleeve body is made from a sheet metal strip profiled at least on one surface, which strip is then bent into a round shape and the cut ends of the strip are brought together and jointed to each other and the gearshift fork guide is formed by two rings arrange parallel to each other and fixed on the outer peripheral surface of the sleeve body.

2. A sliding sleeve of claim 1 wherein at least one ring of the gearshift fork guide is made by a non-chipping shaping procedure.

3. A sliding sleeve of claim 1 wherein symmetric or asymmetric roof slopes are provided on ends of teeth of the toothing of the sleeve body.

* * * * *